（12）United States Patent
Yang et al.

(10) Patent No.: US 11,243,306 B2
(45) Date of Patent: Feb. 8, 2022

(54) METHOD AND APPARATUS FOR ESTIMATING POSITION OF MISSILE

(71) Applicant: AGENCY FOR DEFENSE DEVELOPMENT, Daejeon (KR)

(72) Inventors: Jae-Won Yang, Daejeon (KR); Chung-Ho Ryu, Daejeon (KR); Dong-Ju Lee, Daejeon (KR)

(73) Assignee: Agency for Defense Development, Daejeon (KR)

( * ) Notice: Subject to any disclaimer, the term of this patent is extended or adjusted under 35 U.S.C. 154(b) by 288 days.

(21) Appl. No.: 16/674,984

(22) Filed: Nov. 5, 2019

(65) Prior Publication Data

US 2020/0278442 A1 Sep. 3, 2020

(30) Foreign Application Priority Data

Feb. 28, 2019 (KR) .................. 10-2019-0023667

(51) Int. Cl.
*G01S 13/87* (2006.01)
*G01S 13/88* (2006.01)
*G01S 7/41* (2006.01)

(52) U.S. Cl.
CPC ............ *G01S 13/87* (2013.01); *G01S 7/41* (2013.01); *G01S 13/88* (2013.01)

(58) Field of Classification Search
CPC ............ G01S 13/87; G01S 7/41; G01S 13/88
USPC .......................................................... 342/59
See application file for complete search history.

(56) References Cited

U.S. PATENT DOCUMENTS

| 3,996,590 | A | * | 12/1976 | Hammack | ............... | G01S 13/87 |
| | | | | | | 342/465 |
| 4,783,744 | A | * | 11/1988 | Yueh | ......................... | F41G 7/30 |
| | | | | | | 235/412 |
| 5,163,176 | A | * | 11/1992 | Flumerfelt | .............. | G01S 13/90 |
| | | | | | | 342/174 |
| 5,172,118 | A | * | 12/1992 | Peregrim | .............. | G01S 7/2813 |
| | | | | | | 342/25 D |

(Continued)

FOREIGN PATENT DOCUMENTS

| EP | 0191121 A1 * | 8/1986 | ............. F42B 23/04 |
| EP | 1862756 A1 * | 12/2007 | ........... F41G 7/2286 |

(Continued)

*Primary Examiner* — Bernarr E Gregory
*Assistant Examiner* — Nuzhat Pervin
(74) *Attorney, Agent, or Firm* — Knobbe Martens Olson & Bear LLP

(57) ABSTRACT

In a method for estimating a position of a missile, an incident angle of a signal of a radar irradiated to the moving missile is calculated. The incident angle is defined by an angle between a measurement vector indicating a direction from the radar toward the missile and a movement vector indicating a moving direction of the missile. A distance compensation value from a point on a surface of the missile to an origin point of the missile is calculated based on the calculated incident angle. A distance from the radar to the origin point of the missile is calculated based on the calculated distance compensation value and a distance from the radar to the point on the surface of the missile. A position of the missile is estimated based on a position of the radar and the calculated distance from the radar to the origin point of the missile.

16 Claims, 6 Drawing Sheets

(56) References Cited

U.S. PATENT DOCUMENTS

| | | | | | |
|---|---|---|---|---|---|
| 5,172,119 | A | * | 12/1992 | Young | G01S 7/2813 342/25 A |
| 5,172,120 | A | * | 12/1992 | Slawsby | G01S 13/28 342/25 D |
| 5,172,122 | A | * | 12/1992 | Peregrim | H01Q 1/18 342/154 |
| 5,172,125 | A | * | 12/1992 | Peregrim | G01S 13/904 342/154 |
| 5,173,702 | A | * | 12/1992 | Young | G01S 13/4472 342/17 |
| 5,173,703 | A | * | 12/1992 | Mangiapane | G01S 13/9092 342/25 A |
| 5,173,707 | A | * | 12/1992 | Mangiapane | G01S 13/90 342/149 |
| 5,175,554 | A | * | 12/1992 | Mangiapane | G01S 13/4481 342/149 |
| 5,184,137 | A | * | 2/1993 | Pozgay | H01Q 13/106 342/174 |
| 5,185,608 | A | * | 2/1993 | Pozgay | G01S 13/87 342/17 |
| 5,223,842 | A | * | 6/1993 | Okurowski | G01S 13/90 342/201 |
| 5,225,839 | A | * | 7/1993 | Okurowski | G01S 7/025 342/174 |
| 5,245,347 | A | * | 9/1993 | Bonta | G01S 13/86 342/149 |
| 5,424,742 | A | * | 6/1995 | Long | G01C 21/005 342/25 C |
| 5,881,969 | A | * | 3/1999 | Miller | F41G 7/2226 244/3.17 |
| 6,498,580 | B1 | * | 12/2002 | Bradford | F41G 3/147 342/107 |
| 8,275,544 | B1 | * | 9/2012 | Wells | G01S 17/86 701/501 |
| 8,382,285 | B2 | * | 2/2013 | Eberl | A61B 3/12 351/210 |
| 8,429,153 | B2 | * | 4/2013 | Birdwell | G06K 9/6224 707/722 |
| 9,274,250 | B2 | * | 3/2016 | Pasken | G01W 1/00 |
| 9,285,504 | B2 | * | 3/2016 | Dannevik | G01W 1/00 |
| 9,529,078 | B2 | * | 12/2016 | Holder | G01S 7/0235 |
| 10,118,696 | B1 | * | 11/2018 | Hoffberg | B64C 39/001 |
| 10,274,588 | B2 | * | 4/2019 | Smits | G01S 17/10 |
| 10,324,187 | B2 | * | 6/2019 | Smits | G01S 17/66 |
| 10,620,304 | B2 | * | 4/2020 | Halbert | G01S 13/003 |
| 11,131,750 | B2 | * | 9/2021 | Park | H01Q 1/3233 |
| 2015/0015869 | A1 | * | 1/2015 | Smith | G01S 17/58 356/28.5 |
| 2016/0003579 | A1 | * | 1/2016 | Stansfield | G01S 13/878 244/3.19 |
| 2017/0069214 | A1 | * | 3/2017 | Dupray | G08G 5/0013 |
| 2017/0115103 | A1 | * | 4/2017 | Chargelegue | F42B 10/26 |

FOREIGN PATENT DOCUMENTS

| | | | | |
|---|---|---|---|---|
| FR | 2723191 A1 | * | 2/1996 | H01Q 25/02 |
| GB | 2509787 A | * | 7/2014 | F41G 7/2293 |

* cited by examiner $\Theta = 0$
$R_c = b$ $0 \leq \Theta \leq \beta$
$R_c = b/\cos\Theta$ $\Theta = \beta$
$R_c = c$ $\beta \leq \Theta \leq 90$
$R_c = c \cdot \cos(\Theta - \beta)$ $\Theta = 90$
$R_c = r$ $90 \leq \Theta \leq (90+\alpha)$
$R_c = r \cdot \cos(\Theta - 90)$ $\Theta = 90 + \alpha$
$R_c = d$ $(90+\alpha) \leq \Theta \leq 180$
$R_c = a \cdot \sin(\Theta - 90)$ $\Theta = 180°$
$R_c = a$

METHOD AND APPARATUS FOR ESTIMATING POSITION OF MISSILE

CROSS-REFERENCE TO RELATED APPLICATION

This application claims priority to Korean Patent Application No. 10-2019-0023667, filed on Feb. 28, 2019, the entire contents of which are incorporated herein by reference.

FIELD

The present disclosure relates to a method and apparatus for estimating the position of a missile.

BACKGROUND

Range instrumentation radars are used to obtain the space-time position information of a missile in three-dimensional space and to secure flight safety zones. The range instrumentation radars are classified into mono-pulsed radar, wide-band radar, Doppler radar, and the like.

The mono-pulsed radar transmits a high power pulsed signal of a fixed single frequency for a short time interval, and receives a signal reflected from a target to obtain distance and azimuth/elevation information. The wide-band radar transmits linear frequency modulation (LFM) signals using multiple frequencies to obtain high resolution range profiles. The Doppler radar transmits multiple frequencies to obtain distance information using a Doppler signal reflected from a moving target and obtains azimuth/elevation information by using a phase difference between Doppler signals received by a plurality of array antennas.

The disclosure of this section is to provide background information relating to the invention. Applicant does not admit that any information contained in this section constitutes prior art.

SUMMARY

In view of the above, the present disclosure provides a method and apparatus for estimating the position of a missile more precisely by considering the distance between the surface and the origin point of the missile.

In accordance with an aspect, there is provided a method for estimating a position of a missile, the method comprising: modeling a shape of a missile; calculating an incident angle of a signal of a radar irradiated to the moving missile, the incident angle being defined by an angle between a measurement vector indicating a direction from the radar toward the missile and a movement vector indicating a moving direction of the missile; calculating a distance compensation value from an irradiated point on a surface of the missile to an origin point of the missile based on the calculated incident angle; calculating a distance from the radar to the origin point of the missile based on the calculated distance compensation value and a distance from the radar to the irradiated point on the surface of the missile; and estimating a position of the missile based on a position of the radar and the calculated distance from the radar to the origin point of the missile.

The modeling may comprise: modeling the missile to have a conical head and a cylindrical body such that a base surface of the conical head and one of base surfaces of the cylindrical body contact with each other; modeling the conical head such that a vertex of the conical head is apart from the base surface of the conical head by a predetermined distance; modeling the cylindrical body such that the remaining portion of the missile becomes the cylindrical body; and determining a center point of said one of the base surfaces of the cylindrical body as the origin point of the missile.

In the calculating a distance compensation value, the distance compensation value may be calculated based on a range of the incident angle.

The distance compensation value may be calculated based on predetermined equations, where the predetermined equations include:

$$0 \le \theta \le \beta, R_c = \frac{b}{\cos\theta};$$

$$\beta \le \theta \le 90, R_c = c \times \cos(\theta - \beta);$$

$$90 \le \theta \le (90 + \alpha), R_c = r \times \cos(\theta - 90); \text{ and}$$

$$(90 + \alpha) \le \theta \le 180, R_c = a \times \sin(\theta - 90),$$

where $\theta$ is the incident angle, $\beta$ is an angle formed by a slope line extending from the origin point of the missile to one point on a circumference of the other of the base surfaces of the cylindrical body and a center line perpendicular to the base surfaces and penetrating through the origin point, $R_c$ is the distance compensation value, $b$ is a height of the cylindrical body, $c$ is a length of the slope line, $\alpha$ is an angle formed by the center line and a lateral surface of the conical head, $r$ is a radius of the base surface of the conical head, and $a$ is a height of the conical head.

The radar may include a first radar, a second radar and a third radar which are located at different positions, wherein the measurement vector includes a first measurement vector indicating a direction from the first radar toward the missile, a second measurement vector indicating a direction from the second radar toward the missile, and a third measurement vector indicating a direction from the third radar toward the missile, and wherein the incident angle includes a first incident angle between the movement vector and the first measurement vector, a second incident angle between the movement vector and the second measurement vector and a third incident angle between the movement vector and the third measurement vector.

The distance compensation value may be calculated for each radar based on the first, second and third incident angles.

The calculating the distance from the radar to the origin point of the missile may include calculating a distance from each radar to the origin point of the missile based on the distance compensation value for each radar and a distance from each radar to the irradiated point on the surface of the missile.

The estimating a position of the missile may be performed based on a position of each radar and the distance from each radar to the origin point of the missile.

In accordance with another aspect, there is provided an apparatus for estimating a position of a missile, the apparatus comprising: a modeling unit configured to model a shape of a missile; an incident angle calculating unit configured to calculate an incident angle of a signal of a radar irradiated to the moving missile, the incident angle being defined by an angle between a measurement vector indicating a direction from the radar toward the missile and a movement vector indicating a moving direction of the missile; a distance compensation value calculating unit configured to calculate a distance compensation value from an irradiated point on a surface of the missile to an origin point of the missile depending on based on the calculated incident angle; an origin point calculating unit configured to calculate a distance from the radar to the origin point of the missile based on the calculated distance compensation value and a distance from the radar to the irradiated point on the surface of the missile; and a position estimating unit configured to estimate a position of the missile based on a position of the radar and the calculated distance from the radar to the origin point of the missile.

The modeling unit may model the missile to have a conical head and a cylindrical body such that a base surface of the conical head and one of base surfaces of the cylindrical body contact with each other, model the conical head such that a vertex of the conical head is apart from the base surface of the conical head by a predetermined distance, model the cylindrical body such that the remaining portion of the missile becomes the cylindrical body, and determine a center point of said one of the base surfaces of the cylindrical body as the origin point of the missile.

The distance compensation value calculating unit may calculate the distance compensation value based on a range of the incident angle.

The distance compensation value may be calculated based on predetermined equations, where the predetermined equations include:

$$0 \leq \theta \leq \beta, R_c = \frac{b}{\cos\theta};$$

$$\beta \leq \theta \leq 90, R_c = c \times \cos(\theta - \beta);$$

$$90 \leq \theta \leq (90 + \alpha), R_c = r \times \cos(\theta - 90); \text{ and}$$

$$(90 + \alpha) \leq \theta \leq 180, R_c = a \times \sin(\theta - 90),$$

where $\theta$ is the incident angle, $\beta$ is an angle formed by a slope line extending from the origin point of the missile to one point on a circumference of the other of the base surfaces of the cylindrical body and a center line perpendicular to the base surfaces and penetrating through the origin point, $R_c$ is the distance compensation value, b is a height of the cylindrical body, c is a length of the slope line, $\alpha$ is an angle formed by the center line and a lateral surface of the conical head, r is a radius of the base surface of the conical head, and a is a height of the conical head.

The radar may include a first radar, a second radar and a third radar which are located at different positions, wherein the measurement vector includes a first measurement vector indicating a direction from the first radar toward the missile, a second measurement vector indicating a direction from the second radar toward the missile, and a third measurement vector indicating a direction from the third radar toward the missile, and wherein the incident angle includes a first incident angle between the movement vector and the first measurement vector, a second incident angle between the movement vector and the second measurement vector and a third incident angle between the movement vector and the third measurement vector.

The distance compensation value calculating unit may calculate a distance compensation value for each radar based on the first, second and third incident angles.

The origin point calculating unit may calculate a distance from each radar to the origin point of the missile based on the distance compensation value for each radar and a distance from each radar to the irradiated point on the surface of the missile.

The position estimating unit may estimate a position of the missile based on a position of each radar and the distance from each radar to the origin point of the missile.

With such configurations, it is possible to estimate the position of a missile more precisely by calculating the distance between the surface and the origin point of the missile and using the missile position estimation.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
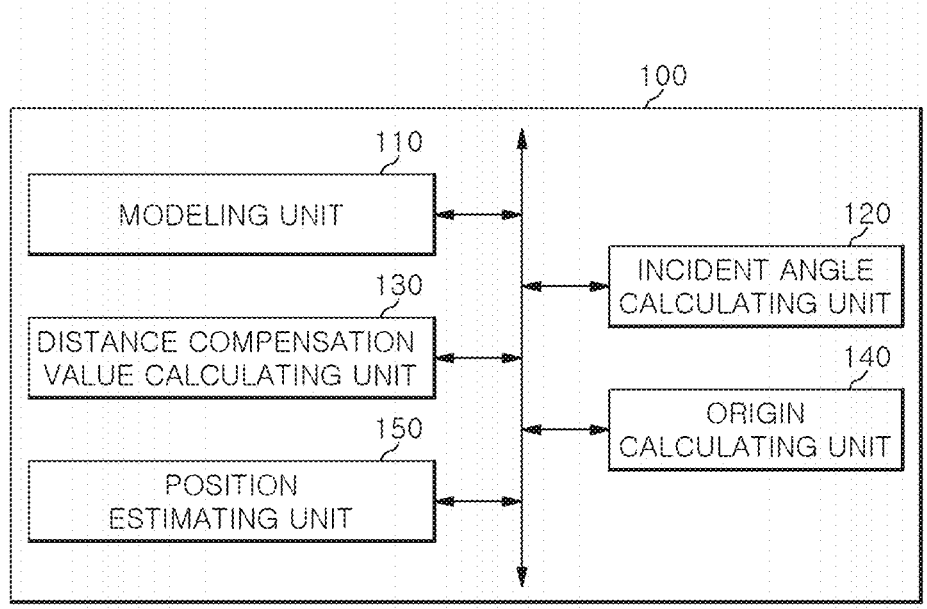
FIG. 1 shows a functional block diagram of a missile position estimation apparatus according to an embodiment of the present disclosure.

Hereinafter, configurations and operations of embodiments will be described in detail with reference to the accompanying drawings. The following description is one of various patentable aspects of the disclosure and may form a part of the detailed description of the disclosure.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

In some implementations, since range instrumentation radars obtain distance information using a signal reflected from the surface of a missile, the distance between the surface and the origin point (centroid) of the missile is not considered in estimating the position of the missile. However, in order to estimate the position of the missile more precisely, the distance between the surface and the origin point of the missile needs to be considered.

FIG. 1 shows a functional block diagram of a missile position estimation apparatus according to an embodiment of the present disclosure. The term such as " . . . unit" described below indicates a unit for processing at least one function or operation, and may be implemented in hardware, software or in combination of hardware and software.

Referring to FIG. 1, the missile position estimation apparatus 100 includes a modeling unit 110, an incident angle calculating unit 120, a distance compensation value calculating unit 130, an origin point calculating unit 140, and a position estimating unit 150. The modeling unit 110 may be implemented by a computing device including a microprocessor. The incident angle calculating unit 120, the distance compensation value calculating unit 130, the origin point calculating unit 140 and the position estimating unit 150 may also be implemented by a computing device including a microprocessor.

The modeling unit 110 can model a shape of a missile. For example, the modeling unit 110 can model a missile to have a conical head and a cylindrical body such that a base surface of the conical head and one of base surfaces of the cylindrical body contact with each other. FIG. 2 shows a specific example of the missile modeling.

The incident angle calculating unit 120 calculates an incident angle of a signal of a radar irradiated to the missile, the incident angle being defined by an angle between a measurement vector indicating the direction from a radar toward the missile and a movement vector indicating the moving direction of the missile. The missile may be moving toward a predetermined target point, and the movement vector may be a vector representing the movement direction of the missile. The measurement vector may be a vector directed from a radar positioned at a specific location on the ground toward the missile.

Figure 3:
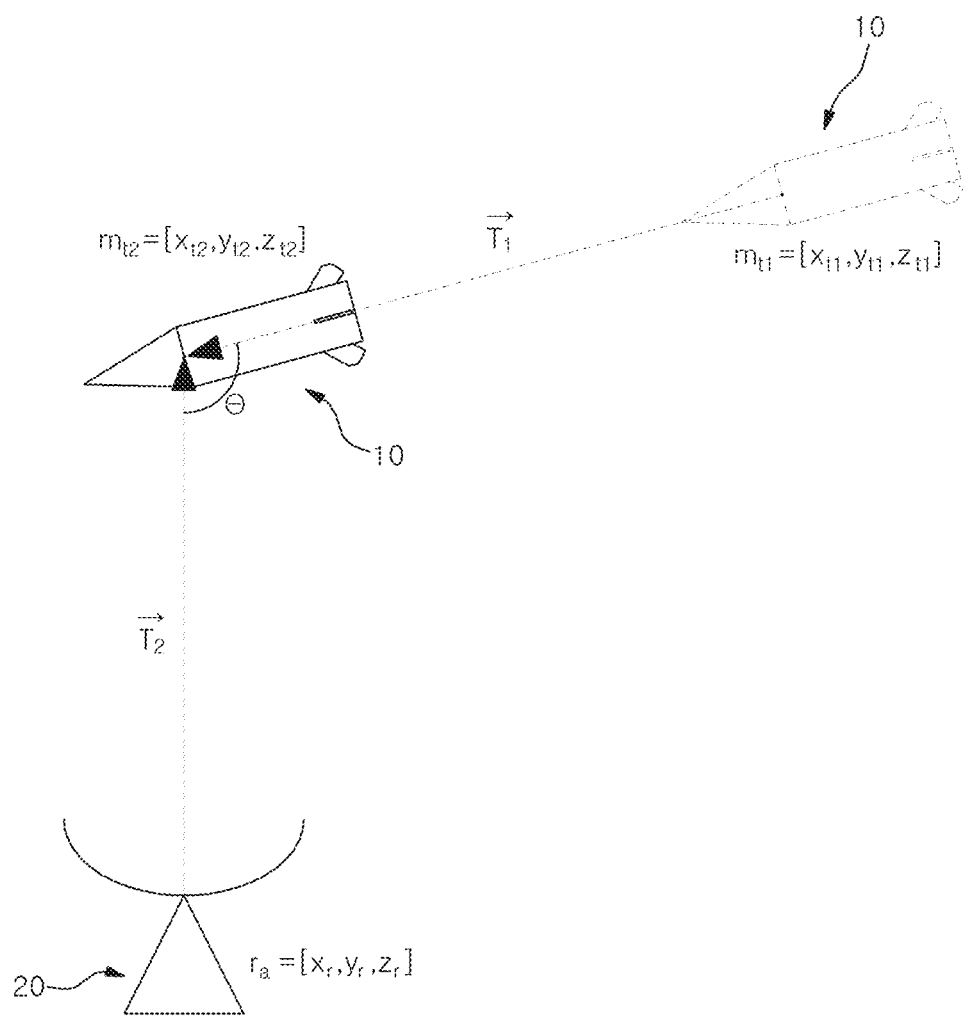
FIG. 3 shows an example of an incident angle of a signal of a radar with respect to a missile in the missile position estimation method according to the embodiment of the present disclosure.

The movement vector and the measurement vector may meet at one point in the missile, and the incident angle calculating unit 120 calculates the incident angle based thereon. FIG. 3 shows a specific example related to the incident angle.

Figure 4:
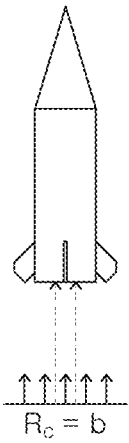
FIG. 4 illustrates an example of a distance compensation value according to the orientation of a missile in the missile position estimation method according to the embodiment of the present disclosure.
Figure 4:
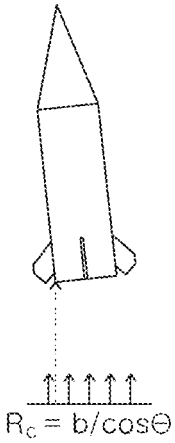
Figure 4:
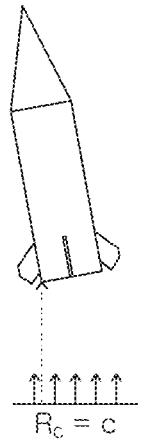
Figure 4:
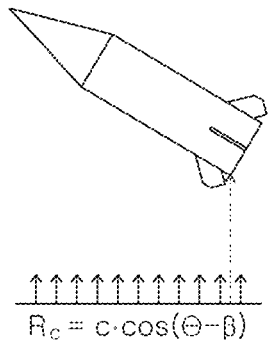
Figure 4:
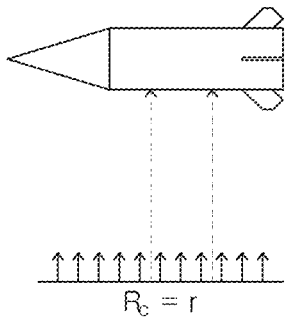
Figure 4:
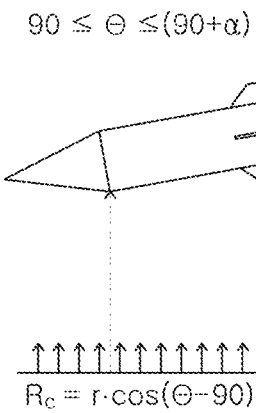
Figure 4:
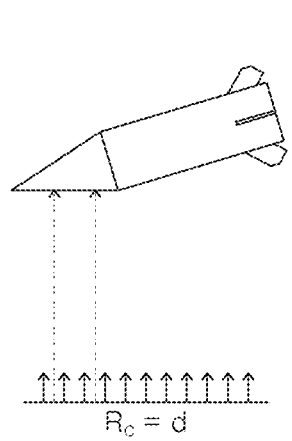
Figure 4:
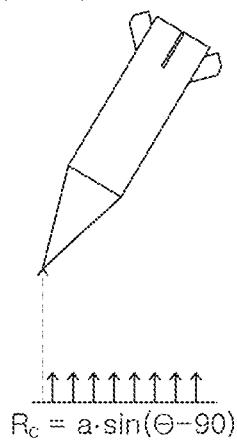
Figure 4:
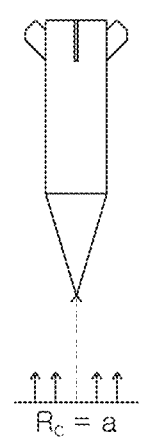

The distance compensation value calculating unit 130 calculates a distance compensation value from an irradiated point on the surface of the missile to the origin point of the missile in consideration of the orientation of the missile. FIG. 4 shows a specific example of the distance compensation value calculated for each orientation of the missile. That is, the distance compensation value calculating unit 130 calculates a distance compensation value from the irradiated point on the surface of the missile to the origin point of the missile based on the calculated incident angle.

The origin point calculating unit 140 calculates a distance from the radar to the origin point of the missile. Specifically, the origin point calculating unit 140 calculates a distance from the radar to the origin point of the missile based on the distance compensation value and a distance from the radar to the surface of the missile, which is measured through the radar. For example, the distance from the radar to the origin point of the missile can be calculated by adding the distance compensation value to the distance from the radar to the missile estimated through the radar.

The position estimating unit 150 estimates the position of the missile based on the position of the radar and the calculated distance from the radar to the origin point of the missile. Meanwhile, the missile position estimation apparatus 100 may use a plurality of (e.g., three) radars to estimate the position of the missile. The radars may be at different positions, and the position estimating unit 150 can estimate the position of the missile based on the distance from each radar to the missile.

Figure 2A:
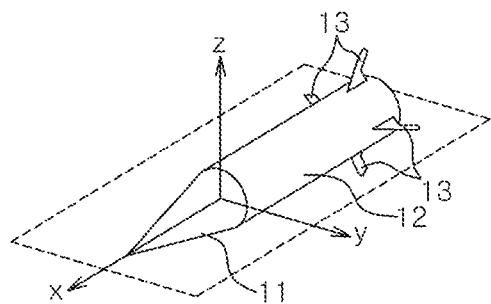
FIGS. 2A to 2C illustrate an example of a missile modeling in a missile position estimation method according to an embodiment of the present disclosure.
Figure 2B:
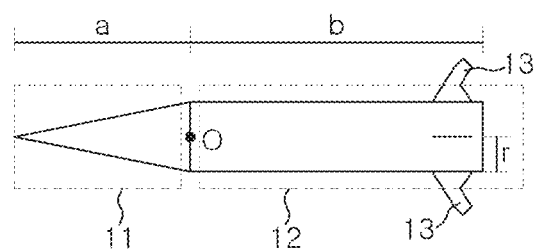
Figure 2C:
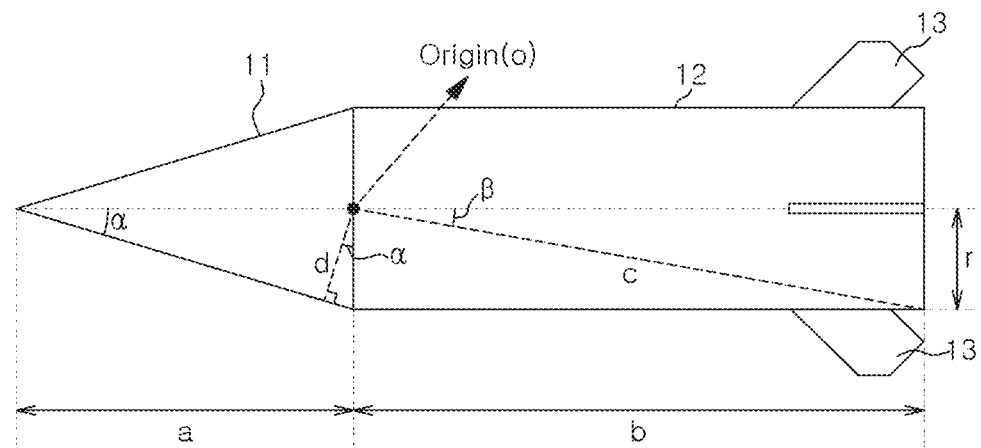

FIGS. 2A to 2C illustrate an example of a missile modeling in a missile position estimation method according to an embodiment of the present disclosure.

FIG. 2A shows the missile on three-dimensional coordinates, and FIG. 2B indicates the xz cross section of the missile. As shown, the missile may have a shape in which a conical head 11 and a cylindrical body 12 are joined. The base surface of the conical head 11 and one of the base surfaces of the cylindrical body 12 contact with each other. Meanwhile, the missile includes a wing 13, but the wing 13 may not be modeled and only the conical head 11 and the cylindrical body 12 may be modeled.

In the missile modeling shown in FIGS. 2A to 2C, the shape of the conical head 11 is determined such that the vertex of the conical head 11 is apart from the base surface of the conical head by a predetermined distance, and the cylindrical body 12 becomes the remaining portion of the missile.

In FIG. 2B, "a" denotes the height of the conical head 11, "b" denotes the height of the cylindrical body 12, and "r" denotes the radius of the base surface of the conical head 11 and the radius of the cylindrical body 12. "O" represents the origin point of the missile, and may be the center point of the contact plane between the base surface of the conical head 11 and the base surface of the cylindrical body 12.

Meanwhile, an actual missile may have a body portion with different radii unlike the cylindrical body 12 shown in FIGS. 2A to 2C. That is, the radius of one end of the body portion of the missile may be smaller or larger than the radius of the other end of the body portion of the missile. However, even in this case, the body portion of the missile can be modeled as the cylindrical body 12. For example, the body portion of the missile may be modeled as the cylindrical body 12 having the radius of the one end or the other end thereof. As another example, the body portion of the missile may be modeled as the cylindrical body 12 having a radius of an average value of the radius of the one end and the other end thereof.

FIG. 2C shows the missile modeling more specifically. In FIG. 2C, "α" is an angle formed by the center line and the lateral surface of the conical head 11, and it can be calculated using the following equation (1).

$$\alpha = \tan^{-1}\left(\frac{r}{a}\right) \qquad \text{Eq. (1)}$$

"β" is an angle formed by a slope line extending from the origin point O of the missile to one point on a circumference of the base surface of the cylindrical body 12 of the missile and the center line of the conical head 11 perpendicular to the base surfaces of the cylindrical body 12 and penetrating through the origin point, and it can be calculated using the following equation (2).

$$\beta = \tan^{-1}\left(\frac{r}{b}\right) \qquad \text{Eq. (2)}$$

"c" is a length of the slope line and it can be calculated using the following equation (3).

$$c=\sqrt{b^2+r^2}$$  Eq. (3)

"d" is a straight length from the origin point O to the lateral surface of the conical head 11 and it can be calculated using the following equation (4).

$$d=r\times\cos(\alpha)$$  Eq. (4)

FIG. 3 shows an example of an incident angle of a signal of a radar irradiated to a missile in the missile position estimation method according to the embodiment of the present disclosure. Hereinafter, the definition of the incident angle calculated by the incident angle calculating unit 120 of FIG. 1 and the method of calculating the incident angle will be described.

Referring to FIG. 3, $m_{t2}$ indicates a current position of the missile 10 and $m_{t1}$ indicates a past position of the missile 10. That is, the missile 10 has been moved from the position of $m_{t1}$ to the position of $m_{t2}$, and a vector representing the movement of the missile 10 is a movement vector $\vec{T}_1$.

The radar 20 is located at a specific position $r_a$ to track the missile 10, and the vector from the radar 20 toward the missile 10 is a measurement vector $\vec{T}_2$.

The angle between the movement vector $\vec{T}_1$ and the measurement vector $\vec{T}_2$ is defined as an incident angle θ of the signal of the radar irradiated to the missile 10.

For a moving missile, if the three dimensional coordinate of $m_{t1}$ is $[x_{t1}, y_{t1}, z_{t1}]$ at time $t_1$ and the three dimensional coordinate of $m_{t2}$ is $[x_{t2}, y_{t2}, z_{t2}]$ at time $t_2$, the movement vector $\vec{T}_1$ can be expressed as the following Eq. (5).

$$\vec{T}_1=(x_{t2}-x_{t1}, y_{t2}-y_{t1}, z_{t2}-z_{t1})$$  Eq. (5)

Meanwhile, the three-dimensional coordinate of $m_{t2}$, that is, the coordinate of the position of the current missile 10 is a target value to be estimated by the missile position estimation apparatus 100, which is not known in the incident angle calculation step.

In this regard, since the distance between the radar 20 and the missile 10 is much larger than the moving distance of the missile 10 from $m_{t1}$ to $m_{t2}$, the difference between the incident angle formed by the measurement vector toward $m_{t1}$ and the movement vector and the incident angle formed by the measurement vector toward $m_{t2}$ and the movement vector is very small. Accordingly, it may be assumed that the incident angle with respect to $m_{t1}$ and the incident angle with respect to $m_{t2}$ are the same.

That is, assuming that the coordinate of $m_{t1}$ is the coordinate of $m_{t2}$, when the coordinate of $r_a$ where the radar is located is $[x_r, y_r, z_r]$, the measurement vector $\vec{T}_2$ can be expressed using the coordinate of $m_{t1}$ as the following Eq. (6).

$$\vec{T}_2=(x_{t1}-x_r, y_{t1}-y_r, z_{t1}-z_r)$$  Eq. (6)

Based on the above, the incident angle θ may be expressed by the following Eq. (7) based on the dot product of a vector.

$$\theta=\cos^{-1}\left(\frac{\vec{T}_1\cdot\vec{T}_2}{\|\vec{T}_1\|\|\vec{T}_2\|}\right)$$  Eq. (7)

Although not specifically illustrated, a plurality of radars located at different positions may be used for estimating the position of the missile. Accordingly, the incident angle calculating unit 120 can calculate an incident angle for each of the plurality of radars based on the method described above with reference to FIG. 3.

FIG. 4 illustrates an example of a distance compensation value depending on the orientation of the missile in the missile position estimation method according to the embodiment of the present disclosure. Hereinafter, the definition of the distance compensation value calculated by the distance compensation value calculating unit 130 of FIG. 1 and a method of calculating the same will be described.

Referring to FIG. 4, the orientation (pitch and yaw) of the missile 10 may change during the movement of the missile 10, and the distance compensation value $R_c$ may vary depending on the orientation of the missile 10. The distance compensation value $R_c$ may be a distance from a point on the surface of the missile 10 to the origin point of the missile 10 depending on the orientation of the missile 10.

Specifically, the radar 20 measures the distance from the radar 20 to the point on the surface of the missile 10, wherein the point on the surface of the missile 10 used for the distance measurement is a surface of missile 10 with which the signal radiated from the radar 20 contacts first.

Therefore, the surface used for the distance measurement is different depending on the orientation of the missile 10, and the distance compensation value $R_c$ also varies accordingly.

Meanwhile, the incident angle θ is a value reflecting the orientation of the missile 10, and the distance compensation value calculating unit 130 calculates the distance compensation value $R_c$ depending on the orientation of the missile 10 by using the incident angle θ.

When the range of the incident angle θ is $0 \leq \theta \leq \beta$, the distance compensation value $R_c$ can be calculated by the following Eq. (8).

$$R_c=\frac{b}{\cos(\theta)}$$  Eq. (8)

When the range of the incident angle θ is $\beta \leq \theta \leq 90$, the distance compensation value $R_c$ can be calculated by the following Eq. (9).

$$R_c=c\times\cos(\theta-\beta)$$  Eq. (9)

When the range of the incident angle θ is $90 \leq \theta \leq (90+\alpha)$, the distance compensation value $R_c$ can be calculated by the following Eq. (10).

$$R_c=r\times\cos(\theta-90)$$  Eq. (10)

When the range of the incident angle θ is $(90+\alpha) \leq \theta \leq 180$, the distance compensation value $R_c$ can be calculated by the following Eq. (11).

$$R_c=a\times\sin(\theta-90)$$  Eq. (11)

Although not specifically illustrated, a plurality of radars located at different positions may be used for estimating the position of the missile. Accordingly, the distance compensation value calculating unit 130 can calculate a distance compensation value to compensate for the distance calculated from each of the plurality of radars based on the method described above with reference to FIG. 4. That is, when there are three radars, a distance from each of the three radars to the missile 10 is calculated, and a distance compensation value for compensating each of the calculated distances is calculated for each of the three radars.

Figure 5:
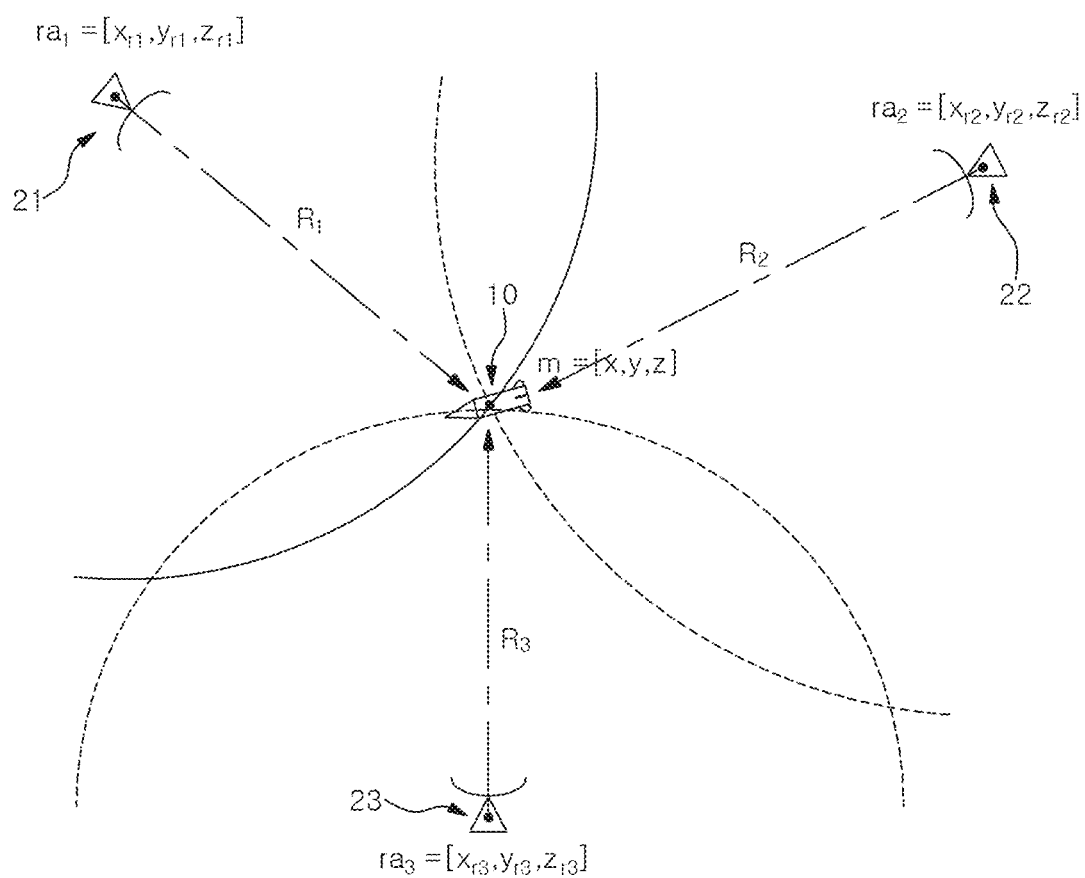
FIG. 5 is a conceptual diagram illustrating the position estimation of the missile using a plurality of radars in the missile position estimation method according to the embodiment of the present disclosure.

FIG. 5 is a conceptual diagram illustrating the position estimation of the missile using a plurality of radars in the missile position estimation method according to the embodiment of the present disclosure.

Referring to FIG. 5, a plurality of radars located at different positions is used to estimate the position of the missile 10. Specifically, the plurality of radars includes a first radar 21, a second radar 22 and a third radar 23, which are located at different positions.

The origin point calculating unit 140 obtains an estimated distance from each of the plurality of radars to the surface of the missile 10. The distance from the radar to the surface of the missile 10 may be a value measured by the function of the radar itself.

The origin point calculating unit 140 calculates the distance from each of the radars to the missile 10, particularly, to the origin point of the missile 10 by adding a distance compensation value to the distance from each of the radars to the surface of the missile 10.

Hereinafter, when the distance from the first radar 21 to the missile 10 is $R_1$, the distance from the second radar 22 to the missile 10 is $R_2$, and the distance from the third radar 23 to the missile 10 is $R_3$, the three-dimensional position of the missile 10 to be obtained is assumed to be [x, y, z].

When the position of the first radar 21 is $[x_{r1}, y_{r1}, z_{r1}]$, $R_1$ can be calculated by the following Eq. (12).

$$R_1 = \sqrt{(x_{r1}-x)^2+(y_{r1}-y)^2+(z_{r1}-z)^2} \quad \text{Eq. (12)}$$

When the position of the second radar 22 is $[x_{r2}, y_{r2}, Z_{r2}]$, $R_2$ can be calculated by the following Eq. (13).

$$R_2 = \sqrt{(x_{r2}-x)^2+(y_{r2}-y)^2+(z_{r2}-z)^2} \quad \text{Eq. (13)}$$

When the position of the second radar 23 is $[x_{r3}, y_{r3}, Z_{r3}]$, $R_3$ can be calculated by the following Eq. (14).

$$R_3 = \sqrt{(x_{r3}-x)^2+(y_{r3}-y)^2+(z_{r3}-z)^2} \quad \text{Eq. (14)}$$

Using the difference between Eqs. (12) and (13), that is, the difference between $R_1$ and $R_2$, the following Eq. (15) can be derived.

$$x = \frac{A-B}{2(x_{r1}-x_{r2})} - \frac{y_{r1}-y_{r2}}{x_{r1}-x_{r2}}y - \frac{z_{r1}-z_{r2}}{x_{r1}-x_{r2}}z \quad \text{Eq. (15)}$$

Here, A represents $x_{r1}^2+y_{r1}^2+z_{r1}^2-R_1^2$, and B represents $x_{r2}^2+y_{r2}^2+z_{r2}^2-R_2^2$.

Using the difference between Eqs. (13) and (14), that is, the difference between $R_2$ and $R_3$, the following Eq. (16) can be derived.

$$x = \frac{B-C}{2(x_{r2}-x_{r3})} - \frac{y_{r2}-y_{r3}}{x_{r2}-x_{r3}}y - \frac{z_{r2}-z_{r3}}{x_{r2}-x_{r3}}z \quad \text{Eq. (16)}$$

Here, C represents $x_{r3}^2+y_{r3}^2+z_{r3}^2-R_3^2$.

Since Eq. (15) and Eq. (16) are the same, the following Eq. (17) can be derived therefrom.

$$y = \frac{(x_{r2}-x_{r3})A+(x_{r3}-x_{r1})B+(x_{r1}-x_{r2})C}{2Y_1} - \frac{Z_1}{Y_1}z \quad \text{Eq. (17)}$$

Here, $Y_1$ represents $(y_{r1}-y_{r2})(x_{r2}-x_{r3})-(y_{r2}-y_{r3})(x_{r1}-x_{r2})$, and $Z_1$ represents $(z_{r1}-z_{r2})(x_{r2}-x_{r3})-(z_{r2}-z_{r3})(x_{r1}-x_{r2})$.

Meanwhile, $R_1$, $R_2$ and $R_3$ are constants obtained by adding the distance compensation values of the radars to the estimated distances from the radars to the missile 10, respectively, and the positions of the radars are also constants that are known. Accordingly, each of the above-mentioned A, B, C, $Y_1$ and $Z_1$ can be represented by a constant.

Based on the above, z coordinate value among the positions of the missile 10 can be estimated by substituting Eq. (15) into x in Eq. (12) and substituting Eq. (17) into y in Eq. (12). By substituting the estimated z coordinate value into Eq. (15), x can be estimated and by substituting the estimated z coordinate value into Eq. (17), y coordinate value can be estimated. That is, coordinate values indicating the position of the missile 10 in the three-dimensional space can be estimated.

Figure 6:
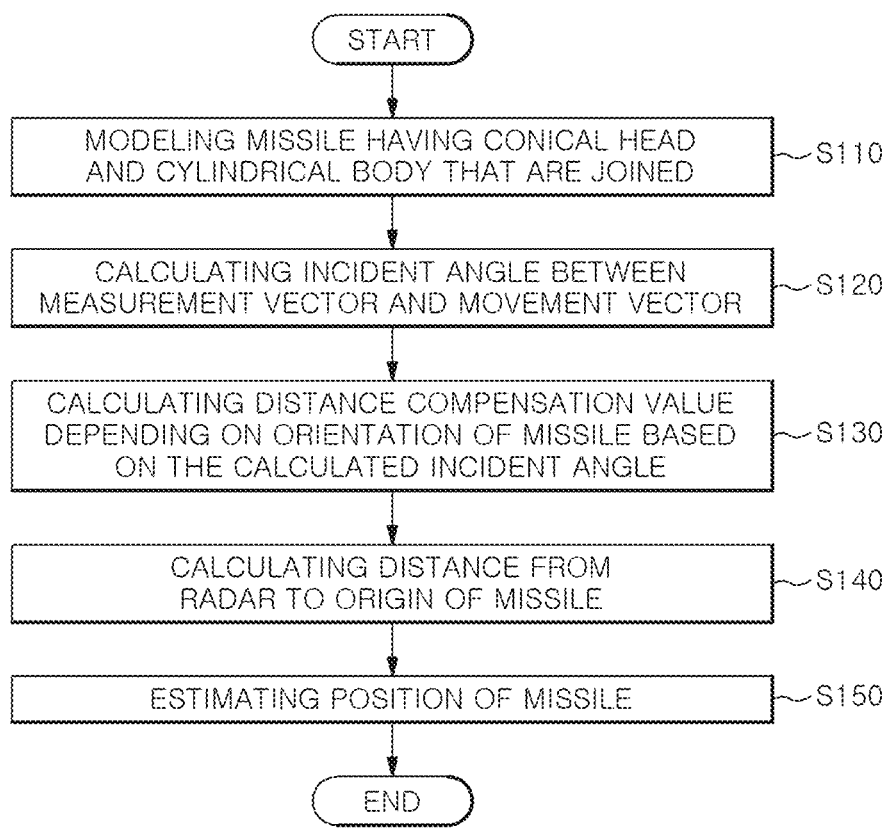
FIG. 6 is a flowchart of each step of the missile position estimation method according to the embodiment of the present disclosure.

FIG. 6 shows a flowchart of each step of the missile position estimation method according to the embodiment of the present disclosure. In addition, the steps of the method shown in FIG. 6 may be performed in a different order from that shown in the drawing.

The modeling unit 110 models a shape of a missile, e.g., a missile having a conical head and a cylindrical body that are joined (step S110).

The incident angle calculating unit 120 calculates an incident angle of a signal of a radar irradiated to the moving missile 10, which is defined by an angle between a measurement vector indicating the direction from a radar toward the missile 10 and a movement vector indicating the moving direction of the missile 10 (step S120). When a plurality of radars is provided, the incident angle calculating unit 120 calculates an incident angle between a measurement vector indicating the direction from each radar toward the missile 10 and a movement vector indicating the moving direction of the missile 10.

The distance compensation value calculating unit 130 calculates a distance compensation value from the irradiated point on the surface of the missile to the origin point of the missile depending on the orientation of the missile based on the magnitude of the calculated incident angle (step S130). When a plurality of radars is provided, the incident angle calculating unit 120 calculates a distance compensation value from the irradiated point on the surface of the missile to the origin point of the missile for each radar in consideration of the incident angle for each radar.

The origin point calculating unit 140 calculates a distance from the radar to the origin point of the missile based on the calculated distance compensation value and a distance from the radar to the surface of the missile, which is measured through the radar (step S140). Specifically, the origin point calculating unit 140 calculates the distance from the radar to the origin point of the missile by adding the distance compensation value to the distance from the radar to the missile estimated through the radar.

When a plurality of radars is provided, the origin point calculating unit 140 calculates the distance from each radar to the origin point of the missile by adding the distance compensation value to the distance from each radar to the missile estimated through each radar.

The position estimating unit 150 estimates the position of the missile based on the position of the radar and the calculated distance from the radar to the origin point of the missile (step S150). Specifically, when a plurality of radars is provided, the position estimating unit 150 estimates the position of the missile based on the position of each radar and the distance from each radar to the missile 10.

The missile position estimation method and apparatus according to the embodiment of the present disclosure can minimize the error in the estimation of the position of the missile 10 and more accurately estimate the position of the missile 10 by estimating the position of the missile 10 based on the distance from each of the plurality of radars to the origin point of the missile 10.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for estimating a position of a missile, the method comprising:
    modeling a shape of a missile;
    calculating an incident angle of a signal of a radar irradiated to the moving missile, the incident angle being defined by an angle between a measurement vector indicating a direction from the radar toward the missile and a movement vector indicating a moving direction of the missile;
    calculating a distance compensation value from an irradiated point on a surface of the missile to an origin point of the missile based on the calculated incident angle;
    calculating a distance from the radar to the origin point of the missile based on the calculated distance compensation value and a distance from the radar to the irradiated point on the surface of the missile; and
    estimating a position of the missile based on a position of the radar and the calculated distance from the radar to the origin point of the missile.

2. The method of claim 1, wherein said modeling comprises:
    modeling the missile to have a conical head and a cylindrical body such that a base surface of the conical head and one of base surfaces of the cylindrical body contact with each other;
    modeling the conical head such that a vertex of the conical head is apart from the base surface of the conical head by a predetermined distance;
    modeling the cylindrical body such that the remaining portion of the missile becomes the cylindrical body; and
    determining a center point of said one of the base surfaces of the cylindrical body as the origin point of the missile.

3. The method of claim 2, wherein in said calculating a distance compensation value, the distance compensation value is calculated based on a range of the incident angle.

4. The method of claim 3, wherein the distance compensation value is calculated based on predetermined equations, where the predetermined equations include:

$$0 \leq \theta \leq \beta, R_c = \frac{b}{\cos\theta};$$

$$\beta \leq \theta \leq 90, R_c = c \times \cos(\theta - \beta);$$

$$90 \leq \theta \leq (90 + \alpha), R_c = r \times \cos(\theta - 90); \text{ and}$$

$$(90 + \alpha) \leq \theta \leq 180, R_c = a \times \sin(\theta - 90),$$

where $\theta$ is the incident angle, $\beta$ is an angle formed by a slope line extending from the origin point of the missile to one point on a circumference of the other of the base surfaces of the cylindrical body and a center line perpendicular to the base surfaces and penetrating through the origin point, $R_c$ is the distance compensation value, $b$ is a height of the cylindrical body, $c$ is a length of the slope line, $\alpha$ is an angle formed by the center line and a lateral surface of the conical head, $r$ is a radius of the base surface of the conical head, and $a$ is a height of the conical head.

5. The method of claim 1, wherein the radar includes a first radar, a second radar and a third radar which are located at different positions,
    wherein the measurement vector includes a first measurement vector indicating a direction from the first radar toward the missile, a second measurement vector indicating a direction from the second radar toward the missile, and a third measurement vector indicating a direction from the third radar toward the missile, and
    wherein the incident angle includes a first incident angle between the movement vector and the first measurement vector, a second incident angle between the movement vector and the second measurement vector and a third incident angle between the movement vector and the third measurement vector.

6. The method of claim 5, wherein the distance compensation value is calculated for each radar based on the first, second and third incident angles.

7. The method of claim 6, wherein said calculating the distance from the radar to the origin point of the missile includes calculating a distance from each radar to the origin point of the missile based on the distance compensation value for each radar and a distance from each radar to the irradiated point on the surface of the missile.

8. The method of claim 7, wherein said estimating a position of the missile is performed based on a position of each radar and the distance from each radar to the origin point of the missile.

9. An apparatus for estimating a position of a missile, the apparatus comprising:
a modeling unit configured to model a shape of a missile;
an incident angle calculating unit configured to calculate an incident angle of a signal of a radar irradiated to the moving missile, the incident angle being defined by an angle between a measurement vector indicating a direction from the radar toward the missile and a movement vector indicating a moving direction of the missile;
a distance compensation value calculating unit configured to calculate a distance compensation value from an irradiated point on a surface of the missile to an origin point of the missile depending on based on the calculated incident angle;
an origin point calculating unit configured to calculate a distance from the radar to the origin point of the missile based on the calculated distance compensation value and a distance from the radar to the irradiated point on the surface of the missile; and
a position estimating unit configured to estimate a position of the missile based on a position of the radar and the calculated distance from the radar to the origin point of the missile.

10. The apparatus of claim 9, wherein the modeling unit models the missile to have a conical head and a cylindrical body such that a base surface of the conical head and one of base surfaces of the cylindrical body contact with each other, models the conical head such that a vertex of the conical head is apart from the base surface of the conical head by a predetermined distance, models the cylindrical body such that the remaining portion of the missile becomes the cylindrical body, and determines a center point of said one of the base surfaces of the cylindrical body as the origin point of the missile.

11. The apparatus of claim 10, wherein the distance compensation value calculating unit calculates the distance compensation value based on a range of the incident angle.

12. The apparatus of claim 11, wherein the distance compensation value is calculated based on predetermined equations, where the predetermined equations include:

$$0 \leq \theta \leq \beta, R_c = \frac{b}{\cos\theta};$$

$$\beta \leq \theta \leq 90, R_c = c \times \cos(\theta - \beta);$$

$$90 \leq \theta \leq (90 + \alpha), R_c = r \times \cos(\theta - 90); \text{ and}$$

$$(90 + \alpha) \leq \theta \leq 180, R_c = a \times \sin(\theta - 90),$$

where $\theta$ is the incident angle, $\beta$ is an angle formed by a slope line extending from the origin point of the missile to one point on a circumference of the other of the base surfaces of the cylindrical body and a center line perpendicular to the base surfaces and penetrating through the origin point, $R_c$ is the distance compensation value, b is a height of the cylindrical body, c is a length of the slope line, $\alpha$ is an angle formed by the center line and a lateral surface of the conical head, r is a radius of the base surface of the conical head, and a is a height of the conical head.

13. The apparatus of claim 9, wherein the radar includes a first radar, a second radar and a third radar which are located at different positions,
wherein the measurement vector includes a first measurement vector indicating a direction from the first radar toward the missile, a second measurement vector indicating a direction from the second radar toward the missile, and a third measurement vector indicating a direction from the third radar toward the missile, and
wherein the incident angle includes a first incident angle between the movement vector and the first measurement vector, a second incident angle between the movement vector and the second measurement vector and a third incident angle between the movement vector and the third measurement vector.

14. The apparatus of claim 13, wherein the distance compensation value calculating unit calculates a distance compensation value for each radar based on the first, second and third incident angles.

15. The apparatus of claim 14, wherein the origin point calculating unit calculates a distance from each radar to the origin point of the missile based on the distance compensation value for each radar and a distance from each radar to the irradiated point on the surface of the missile.

16. The apparatus of claim 15, wherein the position estimating unit estimates a position of the missile based on a position of each radar and the distance from each radar to the origin point of the missile.

* * * * *